(12) United States Patent
Lee et al.

(10) Patent No.: US 10,498,189 B2
(45) Date of Patent: Dec. 3, 2019

(54) LOW IMPEDANCE POWER DISC

(71) Applicant: SOUTHERN TAIWAN UNIVERSITY OF SCIENCE AND TECHNOLOGY, Tainan (TW)

(72) Inventors: Cho Yu Lee, Tainan (TW); Jui Hung Chang, Tainan (TW); Chin Fong Lim, Tainan (TW)

(73) Assignee: South Taiwan University of Science and Technology, Tainan (TW)

( * ) Notice: Subject to any disclaimer, the term of this patent is extended or adjusted under 35 U.S.C. 154(b) by 366 days.

(21) Appl. No.: 15/622,287

(22) Filed: Jun. 14, 2017

(65) Prior Publication Data

US 2017/0373559 A1 Dec. 28, 2017

(30) Foreign Application Priority Data

Jun. 24, 2016 (TW) .............................. 105119822 A

(51) Int. Cl.
| | |
|---|---|
| *H02K 7/00* | (2006.01) |
| *F02B 75/06* | (2006.01) |
| *F16C 3/06* | (2006.01) |
| *H02K 1/22* | (2006.01) |
| *H02K 5/16* | (2006.01) |
| *H02K 7/18* | (2006.01) |

(52) U.S. Cl.
CPC ............. *H02K 7/003* (2013.01); *F02B 75/06* (2013.01); *F16C 3/06* (2013.01); *H02K 1/22* (2013.01); *H02K 5/165* (2013.01); *H02K 7/006* (2013.01); *H02K 7/1815* (2013.01)

(58) Field of Classification Search
CPC .......... H02K 7/02; H02K 7/006; H02K 7/118; H02K 7/20; H02K 1/2786; H02K 1/2733
USPC ........... 310/74, 75 R, 78–79, 102 R, 156.12, 310/156.37; 290/46–48
See application file for complete search history.

(56) References Cited

U.S. PATENT DOCUMENTS

2015/0180302 A1* 6/2015 Jang ..................... H02K 5/1732
310/90

\* cited by examiner

*Primary Examiner* — Jeremy A Luks
(74) *Attorney, Agent, or Firm* — Rosenberg, Klein & Lee

(57) ABSTRACT

A low impedance power disc is provided. The power disc is connected to a crankshaft of an engine, and includes a rotor, a connecting shaft, and a permanent magnet. The rotor is disposed separately from the permanent magnet. The connecting shaft is locked inside the rotor. A unidirectional bearing is provided and fitted on the connecting shaft. The permanent magnet is fitted on the unidirectional bearing. When the engine is running, the rotor and the permanent magnet are rotated at the same speed to generate electricity and supply the electricity to the vehicle and to charge the battery. When the engine decelerates, the rotor and the connecting shaft are decelerated synchronously with the engine, while the permanent magnet and the unidirectional bearing are continuously rotated at the speed before deceleration in order to facilitate the engine to accelerate again, so that the rotor can be quickly rotated.

1 Claim, 3 Drawing Sheets

LOW IMPEDANCE POWER DISC

FIELD OF THE INVENTION

The present invention relates to a power disc, and more particularly to a low impedance power disc which is coupled to a crankshaft of an engine, and can reduce the impedance of the crankshaft of the engine to enhance the efficiency of power generation.

BACKGROUND OF THE INVENTION

In a vehicle ignition system, a power disc is used to assist the vehicle in starting power generation and supplying electric power. A conventional power disc is coupled to the crankshaft of the engine, and includes a rotor and a connecting shaft. A permanent magnet is provided on the inner periphery of the rotor. A coil stator is provided in the permanent magnet. When the motor is started, it will drive the reduction gear and the one-way clutch to turn the crankshaft and then drive the engine cylinder to run, while the crankshaft will drive the power disc to rotate, such that the rotor and the permanent magnet generate electric power by excitation to supply the electric power to the vehicle and to charge the battery.

Because the rotor is easy to wear during the process of operation, it is made of a metal material. The permanent magnet of the conventional power disc is coupled to the rotor. The entire weight of the power disc is heavier to increase the impedance of the crankshaft, which indirectly affects the engine performance and fuel consumption performance.

In order to improve the above-mentioned deficiencies, Taiwan Patent Publication No. M495039 discloses a "two-in-one structure of generator and starting motor". A one-way clutch is connected between a crankshaft of an engine and a permanent magnet rotor of a starting motor. The permanent magnet rotor of the starting motor is provided with a generator coil rotor, so that the permanent magnet rotor of the starting motor drives the crankshaft to start the engine. The crankshaft synchronously drives the permanent magnet rotor of the generator to rotate, so that the generator coil stator produces a magnetic field to generate electric power, thereby integrating power generation and starting the motor for the starting motor to have enough torque to drive the crankshaft to save power consumption.

Taiwan Patent Publication No. M502744 discloses a "motorcycle power disc". The outer periphery of the power disc is provided with a plurality of scales, a return-to-zero line, and a plurality of cooling holes. The rotor of the power disc is provided with a shaft, positioning scales, and a plurality of adjustment hole. The shaft of the rotor of the power disc is equipped with a strengthening ring. When the rotor of the power disc drives the power disc, the strengthening ring is used to protect the rotor of the power disc. Even if the rotor of the power disc is made of a lightweight material, it is not easy to wear.

However, although the above-mentioned patents can reduce the torque required to start the crankshaft by integrating the power generation and starting the motor or using a lightweight rotor, they cannot simultaneously improve the charging efficiency of the battery. Accordingly, the inventor of the present invention has devoted himself based on his many years of practical experiences to solve these problems.

SUMMARY OF THE INVENTION

In view of the shortcomings that the conventional power discs can reduce the torque required to start the crankshaft by integrating the power generation and starting the motor or using a lightweight rotor, but they cannot simultaneously improve the charging efficiency of the battery.

The object of the present invention is to provide a low impedance power disc. A permanent magnet is disposed separately from a rotor, and a unidirectional bearing is provided between a connecting shaft and the permanent magnet, thereby continuously rotating the permanent magnet to enhance the power generation efficiency.

In order to achieve the aforesaid object, a low impedance power disc is provided. The power disc is connected to a crankshaft of an engine, and includes a rotor, a connecting shaft, and a permanent magnet. The rotor is disposed separately from the permanent magnet. The connecting shaft is locked inside the rotor. A unidirectional bearing is provided and fitted on the connecting shaft. The permanent magnet is fitted on the unidirectional bearing.

Based on the above, when the engine is running and in an accelerated state, the power disc is driven by the crankshaft to generate power for supplying the power to the vehicle and charging the battery. When the engine is decelerated or in an idling state, since the permanent magnet is disposed separately from the rotor and the unidirectional bearing is located between the permanent magnet and the connecting shaft, so that the rotor and the connecting shaft will be decelerated synchronously with the engine to provide a normal rotational speed signal for the engine. The permanent magnet is continuously rotated by the inertia and subject to the unidirectional bearing, so the battery can be continuously charged. In addition, when the engine is accelerated again, the rotor of the power disc can be rapidly rotated because the weight resistance of the permanent magnet is reduced, thereby reducing the impedance of the engine crankshaft and the power required to drive the power disc to enhance the engine performance and power generation efficiency.

DESCRIPTION OF THE PREFERRED EMBODIMENTS

Advantages and features of the inventive concept and methods of accomplishing the same may be understood more readily by reference to the following detailed description of embodiments and the accompanying drawings.

Figure 1:
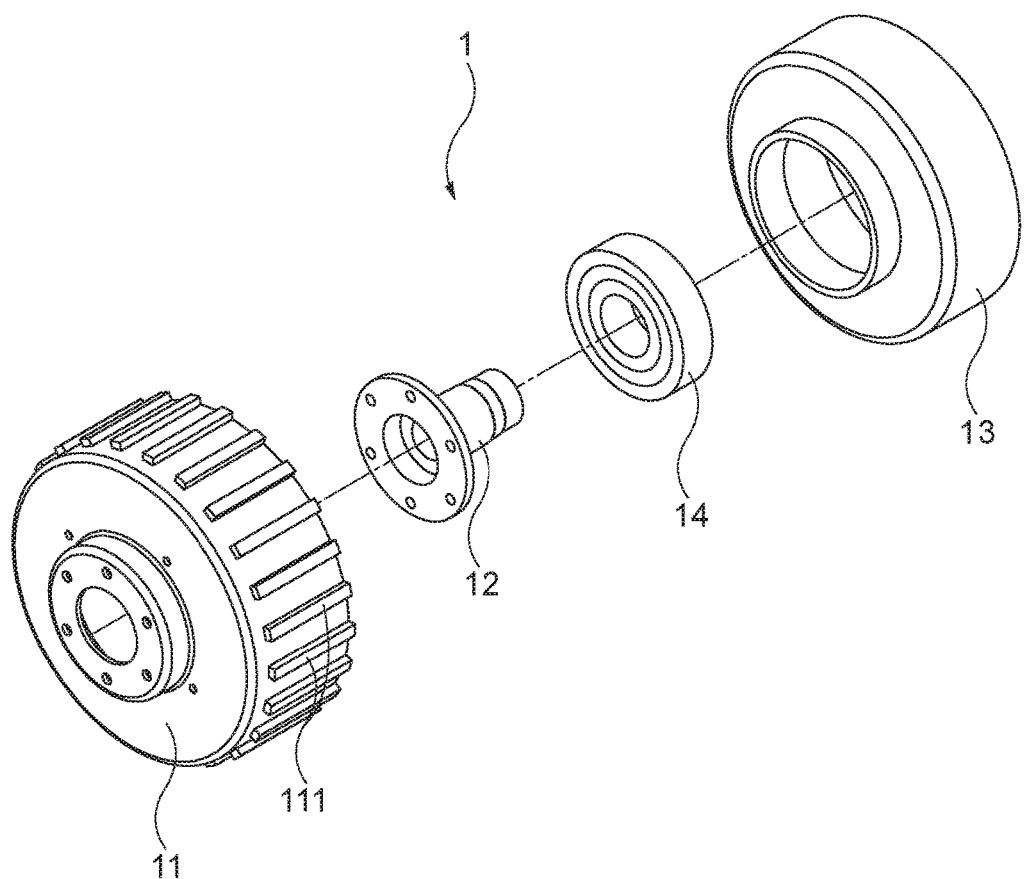
FIG. 1 is a perspective view of the present invention.

FIG. 1 is a perspective view of the present invention. The present invention discloses a low impedance power disc. The power disc 1 is connected to a crankshaft of an engine, and includes a rotor 11, a connecting shaft 12, and a permanent magnet 13. The rotor 11 is disposed separately from the permanent magnet 13. The connecting shaft 12 is locked inside the rotor 11. A unidirectional bearing 14 is provided and fitted on the connecting shaft 12. The permanent magnet 13 is fitted on the unidirectional bearing 14.

Figure 2:
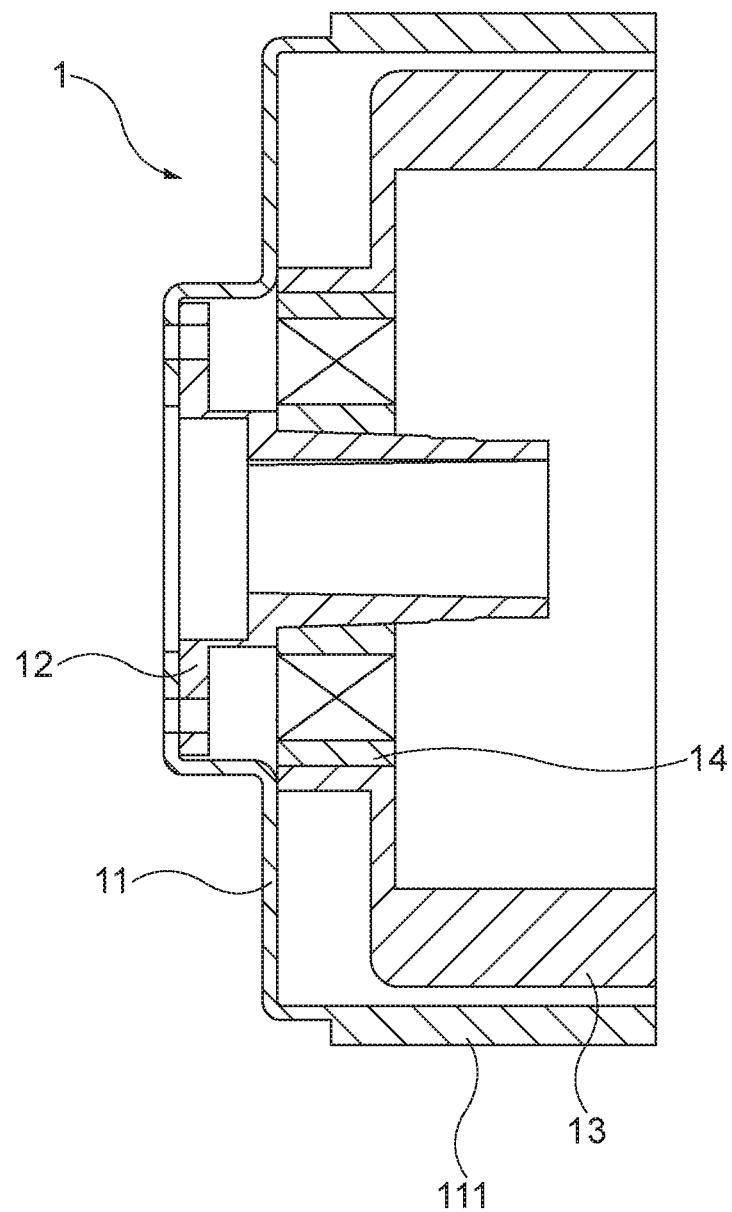
FIG. 2 is a sectional view of the present invention.

As shown in FIG. 2, when assembled, the connecting shaft 12 is locked to the rotor 11, the unidirectional bearing 14 is fitted on the connecting shaft 12, and the permanent magnet 13 is fitted on the unidirectional bearing 14. A coil stator (not shown) is provided in the permanent magnet 13. The crankshaft is inserted in the connecting shaft 12 of the power disc 1. The rotor 11 is provided with a plurality of raised blocks 111 on an outer wall thereof, so that a sensor can detect the position of the raised blocks 111 of the rotor 11, thereby controlling the engine piston stroke to be located in the intake or compression zone.

Figure 3:
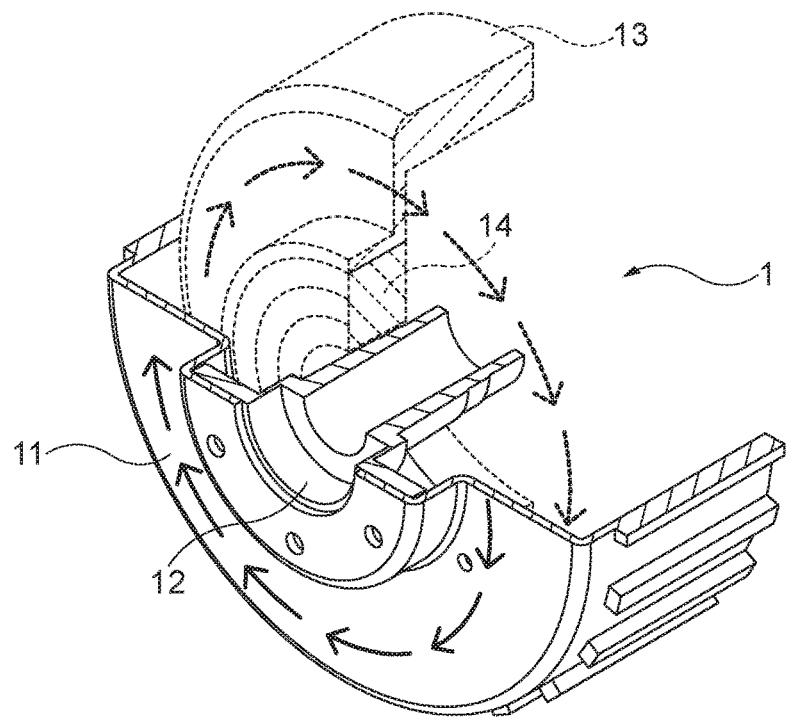
FIG. 3 is a schematic view of the present invention, showing the engine in a high-speed state.

FIG. 3 is a schematic view of the present invention, showing the engine in a high-speed state. When the motor is actuated, the reduction gear and the one-way clutch are driven to rotate the crankshaft to drive the engine cylinder. At this time, the crankshaft drives the power disc 1 to rotate, so that the rotor 11 and the permanent magnet 13 are rotated at the same speed for excitation (as indicated by the arrows in FIG. 3), thereby generating power to supply the power to the vehicle and to charge the battery.

Figure 4:
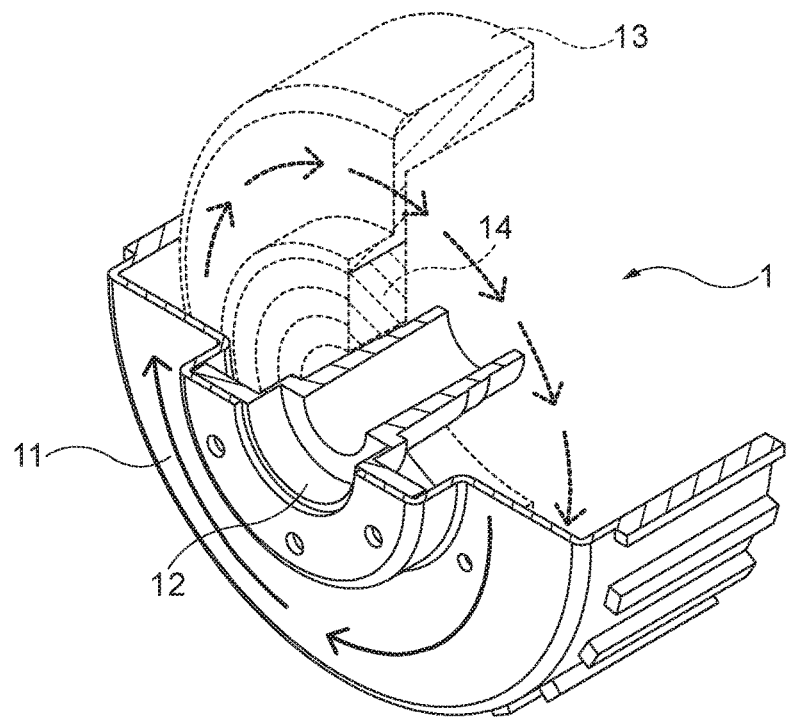
FIG. 4 is a schematic view of the present invention, showing the engine in a deceleration state.

FIG. 4 is a schematic view of the present invention, showing the engine in a deceleration state or in an idling state. The rotor 11 is disposed separately from the permanent magnet 13, and the unidirectional bearing 14 is disposed between the permanent magnet 13 and the connecting shaft 12. When the engine is decelerated, the rotor 11 and the connecting shaft 12 will decelerate synchronously with the engine (as indicated by the solid arrows in FIG. 4) to provide a normal rotational speed signal for the engine. At this time, the permanent magnet 13 is rotated by the inertia and subject to the unidirectional bearing 14, so that the permanent magnet 13 and the unidirectional bearing 14 keep the rotational speed signal before deceleration to rotate (as indicated by the dashed lines FIG. 4). The battery can be continuously charged. In addition, when the engine is accelerated again, the rotor 11 is disposed separately from the permanent magnet 13, so that the weight resistance of the permanent magnet 13 can be reduced, and the rotor 11 can be rapidly rotated to the rotational speed signal before deceleration, thereby reducing the impedance of the crankshaft of the engine and the power required to drive the power disc 1 to enhance the engine performance and power generation efficiency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A low impedance power disc, connected to a crankshaft of an engine and comprising a rotor, a connecting shaft, and a permanent magnet, characterized in that: the rotor is disposed separately from the permanent magnet, the connecting shaft is locked inside the rotor, a unidirectional bearing is provided and fitted on the connecting shaft, and the permanent magnet is fitted on the unidirectional bearing.

* * * * *